United States Patent
Voris et al.

(10) Patent No.: US 10,069,730 B2
(45) Date of Patent: Sep. 4, 2018

(54) SYSTEMS AND METHODS FOR PREDICTIVE DELIVERY OF HIGH BIT-RATE CONTENT FOR PLAYBACK

(71) Applicant: Disney Enterprises, Inc., Burbank, CA (US)

(72) Inventors: James Voris, Burbank, CA (US); Mark Arana, Burbank, CA (US); Edward Drake, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 827 days.

(21) Appl. No.: 14/295,270

(22) Filed: Jun. 3, 2014

(65) Prior Publication Data

US 2015/0350277 A1 Dec. 3, 2015

(51) Int. Cl.
*G06F 15/16* (2006.01)
*H04L 12/801* (2013.01)
*H04L 29/06* (2006.01)
*H04N 21/238* (2011.01)
*H04N 21/24* (2011.01)
*H04N 21/845* (2011.01)

(52) U.S. Cl.
CPC .......... *H04L 47/10* (2013.01); *H04L 65/4084* (2013.01); *H04L 65/80* (2013.01); *H04N 21/23805* (2013.01); *H04N 21/2402* (2013.01); *H04N 21/8456* (2013.01)

(58) Field of Classification Search
CPC ....................................................... H04L 65/60
See application file for complete search history.

(56) References Cited

U.S. PATENT DOCUMENTS

| | | | |
|---|---|---|---|
| 8,396,983 B1 | 3/2013 | Inskip et al. | |
| 8,589,583 B2 | 11/2013 | Gutarin et al. | |
| 2011/0022705 A1* | 1/2011 | Yellamraju | H04L 65/1069 709/224 |
| 2011/0122939 A1* | 5/2011 | Ganesan | H04N 19/115 375/240.01 |
| 2012/0005368 A1 | 1/2012 | Knittle | |
| 2012/0143994 A1* | 6/2012 | Calcev | G06F 17/30817 709/219 |
| 2013/0041808 A1 | 2/2013 | Pham | |
| 2014/0165118 A1* | 6/2014 | Garcia Mendoza | H04L 65/605 725/90 |
| 2015/0180924 A1* | 6/2015 | O'Callaghan | H04L 65/605 709/219 |
| 2015/0326868 A1* | 11/2015 | Ezhov | H04N 19/40 709/219 |
| 2017/0111665 A1* | 4/2017 | Suryanarayanan | H04N 21/222 |

OTHER PUBLICATIONS

Patent Cooperation Treaty, International Search Report for PCT/US2015/026261, dated Jul. 27, 2015, pp. 1-2.

* cited by examiner

*Primary Examiner* — Yves Dalencourt
(74) *Attorney, Agent, or Firm* — Sheppard Mulliln; David Heisey; Jonathan Marina (57) ABSTRACT

The present disclosure provides for systems and methods for predictive delivery of high bit-rate content. The disclosed systems and methods provide an adaptive-bit-rate streaming (ABS) system with more robust information, thereby allowing more intelligent pre-caching of the media content. By providing greater information to the ABS system, the disclosed systems are able to foresee higher bit-rate segments that require greater attention, allowing the system to use such information to improve the playback experience.

20 Claims, 5 Drawing Sheets

SYSTEMS AND METHODS FOR PREDICTIVE DELIVERY OF HIGH BIT-RATE CONTENT FOR PLAYBACK

TECHNICAL FIELD

The present disclosure relates generally to digital media, and more particularly to systems and methods for predictive delivery of high bit-rate content for playback.

SUMMARY OF THE INVENTION

The present disclosure may be embodied in a method comprising receiving a request from a device for transmission of a media content asset, the media content asset comprising a plurality of segments arranged in a particular order, at least one of the plurality of segments being a high bit-rate segment; transmitting the plurality of segments in the particular order to the device; detecting the high bit-rate segment; and transmitting data for the high bit-rate segment out of order in one or more segments preceding the high bit-rate segment to the device.

In one aspect of this embodiment, the media content asset may further comprise a manifest file.

In another aspect of this embodiment, the method may further comprise detecting transmission conditions. In a further aspect, the transmission conditions may be used to determine a high bit-rate segment.

In yet another aspect, transmitting data for the high bit-rate segment out of order may further comprise transmitting data for the high bit-rate segment simultaneously with segments that occur earlier in the particular order.

In another embodiment, the present disclosure may be embodied in a method comprising requesting transmission of a media content asset, the media content asset comprising a plurality of constant or variable bit-rate segments arranged in a particular order, at least one of the plurality of segments being a high bit-rate segment; receiving bit-rate information for upcoming segments in the media content asset; receiving the plurality of segments in the particular order; detecting an upcoming high bit-rate segment using the bit-rate information; requesting data for the high bit-rate segment out of order; and receiving the requested data for the high bit-rate segment out of order.

In one aspect of this embodiment, the media content asset may further comprise a plurality of headers associated with one or more of the plurality of segments, and the bit-rate information may be contained within the plurality of headers. In a further aspect, each of the plurality of segments may comprise a header. Each of the plurality of segment may contain bit-rate information for a pre-determined number of upcoming segments.

In another aspect, the media content asset may further comprise a manifest file, and the bit-rate information may be contained within the manifest file.

In yet another aspect, requesting data for the high bit-rate segment out of order may further comprise requesting data for the high bit-rate segment simultaneously with segments that occur earlier in the particular order.

The present disclosure may also be embodied in computer readable media comprising an instruction set configured to command a computing device to carry out the methods described herein.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

DETAILED DESCRIPTION

The disclosure provided herein describes systems and methods for predictive delivery of high bit-rate content.

Internet-delivered media is primarily delivered via two methods today: local download is a method to deliver a media file for local storage and playback to a media application or device (i.e., a receiving device), while streaming is a method to deliver and view a media file in real-time without long-term local storage.

The streaming approach allows content to be received by a computing device and played back by that computing device during delivery. In other words, a user utilizing a computing device may begin playback of the content before the entirety of the content has been received. For example, a user may begin watching the beginning of a piece of video content, or listening to the beginning of a piece of audio content, while the middle and end of the content are still being delivered. However, streaming delivery can be vulnerable to changes in network bandwidth, transmission delays, and packet loss that can negatively impact playback and incur buffering problems.

Adaptive bit-rate streaming (ABS) has been introduced to overcome some of the shortcomings in Internet delivery. In ABS, the ABS system detects transmission conditions in real-time. Such transmission conditions may include a plurality of factors, such as available bandwidth, transmission delay, and available CPU and/or power resources of the transmitting and/or receiving device. Based on the transmission conditions, the bit-rate of the streaming multimedia content is adjusted accordingly. The ABS system utilizes multiple versions of the same content at various bit-rates, which correspond to varying quality levels.

Several ABS approaches are commonly used. In a first approach, multiple versions of a streamable media file are available at different quality levels, and the receiving device "jumps" from one media source to another in response to specific transmission criteria. In a second approach, a media file is first divided into shorter segments (e.g., 3 seconds of content) before being encoded at different quality levels, and the receiving device can then request a subsequent portion at an appropriate bit rate depending on a similar set of criteria. Media file "segments," as broadly discussed and understood herein, may also be referred to as "blocks" or "portions." Either approach may further utilize layered encoding, in which progressive reconstruction at increasingly higher quality is possible as additional data is transmitted depending on transmission conditions.

Within a single media content file, there may be segments of the media content that require greater bit-rates than other segments for streaming. For example, during playback of a streamed movie, the movie playback may encounter lower visual quality during heavy action sequences that include special effects, explosions, and/or rapid camera movements. This is because the video content may be transcoded with a target and peak bit-rate that, while sufficient for most scenes in the movie, may not be sufficient to properly display the high-intensity segments without some blocking artifacts. This problem is exacerbated by the fact that many of these high-action scenes are some of the most important within a piece of media content, so any loss of bandwidth during these high-intensity scenes will have a greater negative impact on a user's viewing experience than a degradation of quality during a less important segment of the content.

The present disclosure provides for systems and methods for predictive delivery of high bit-rate content. The disclosed systems and methods provide an adaptive-bit-rate streaming system with more robust information, thereby allowing more intelligent pre-caching of the media content. By providing greater information to the ABS system, the disclosed systems are able to foresee higher bit-rate segments that require greater attention, and use such information to improve the playback experience. Several exemplary embodiments are disclosed with reference to the figures.

Figure 1:
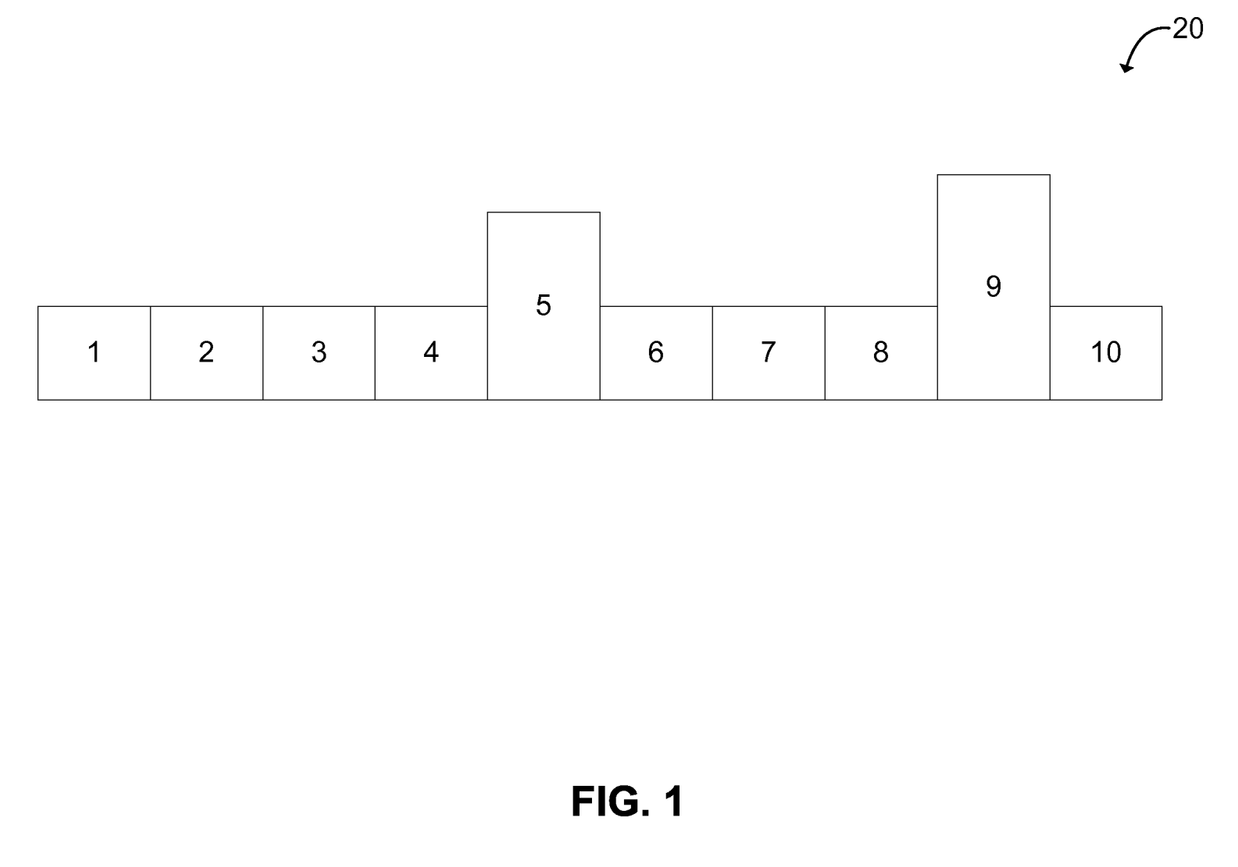
FIG. 1 schematically depicts a sample media content asset having high bit-rate segments.

FIG. 1 schematically depicts a sample media content asset 20. Although other media content asset types are available and known, for the sake of describing the present systems and methods using discrete examples, media content asset 20 will be treated as a video content asset. Media content asset 20 has ten segments, 1-10. The vertical height of each segment 1-10 is representative of the bit-rate of that particular segment. As such, segments 1-4, 6-8, and 10 have the same, lower bit-rate, while segments 5 and 9 are high bit-rate segments. For example, the lower bit-rate segments may be transcoded at 500 kb/sec, while segment 5 may be transcoded at 1000 kb/sec and segment 9 may be transcoded at 1250 kb/sec. Certain segments may be transcoded at higher bit-rates due to a high level of movement and/or detail that is contained within those segments which require additional data for those segments to be presented clearly and in optimal detail.

It should be understood that the bit-rates of the segments shown in FIG. 1 are not absolute, and are relative to other segments. For example, in an ABS system, there are typically multiple versions of a single media content asset having different levels of quality. So, using the bit-rate figures discussed above, there may be a low-quality version with bit-rates ranging from 250 kb/sec to 625 kb/sec, and a normal quality version with bit-rates ranging from 500 kb/sec to 1250 kb/sec, and a high quality version with bit-rates ranging from 1000 kb/sec to 2500 kb/sec. The systems and methods disclosed with reference to FIGS. 2-4 allow a user to view all segments of the media content asset 20 at a high quality, even if their receiving devices' transmission conditions are unable to properly receive the high bit-rate segments in a conventional streaming arrangement.

Figure 2:
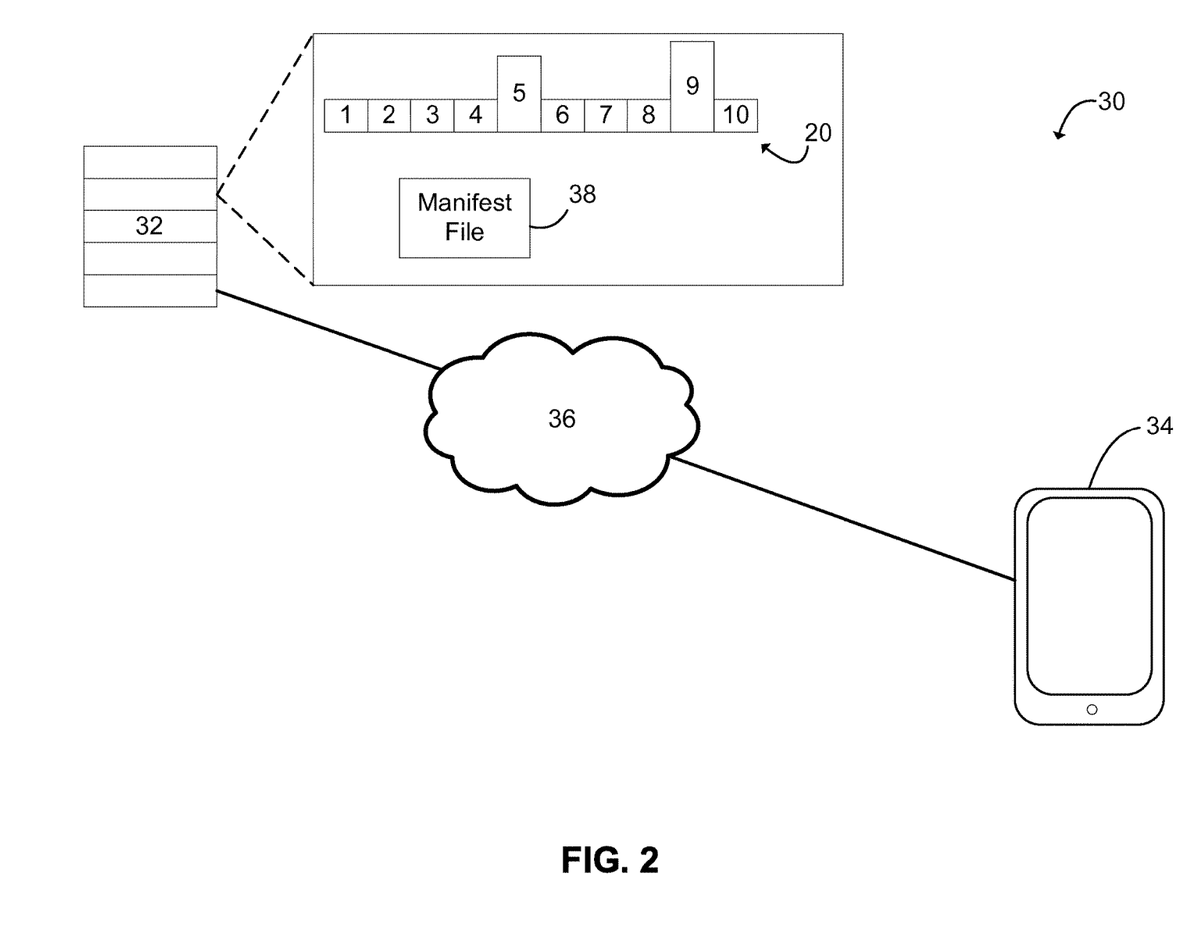
FIG. 2 schematically depicts a smart-server arrangement for providing the media content asset of FIG. 1 to a receiving device.

FIG. 2 schematically depicts a "smart server" system 30 for providing media content asset 20 to a receiving device 34. The system 30 depicted in FIG. 2 includes a content server 32 and a receiving device 34. The content server 32 stores the media content asset 20, and transmits the media content asset 20 to the receiving device 34 over a network 36 (e.g., the Internet), for playback on the receiving device 34. The content server 32 also stores, or otherwise has access to, a manifest file 38. The manifest file 38 contains bit-rate information for the media content asset 20, which may also be referred to as "look-ahead" information because it informs of the bit-rates of upcoming segments. The bit-rate information contained in the manifest file 38 may be bit-rate information for each segment 1-10, or it may contain information only for "high bit-rate" segments such as segments 5 and 9, or any other arrangement that would allow the content server 32 to predict upcoming bit-rate requirements for the media content asset 20.

In the "smart server" system 30 shown in FIG. 2, the receiving device 34 requests a particular media content asset 20 for playback. The content server 32 receives the request, and then pulls up the requested media content asset 20 and the relevant manifest file 38. As the content server 32 begins to transmit the media content asset 20 to the receiving device 34, it monitors transmission conditions to the receiving device 34 to determine the appropriate version of the media content asset 20 to transmit. For example, if transmission conditions are good (e.g., high available bandwidth and computing resources), then a high-quality version of the asset 20 is transmitted, so that the user gets the best viewing experience available. Conversely, if transmission conditions are bad (e.g., low available bandwidth and/or computing resources), then a lower quality version of the asset 20 is transmitted. In this way, despite the poor transmission conditions, the user is still able to stream the best version of the media asset 20 that the transmission conditions will allow.

Figure 3A:
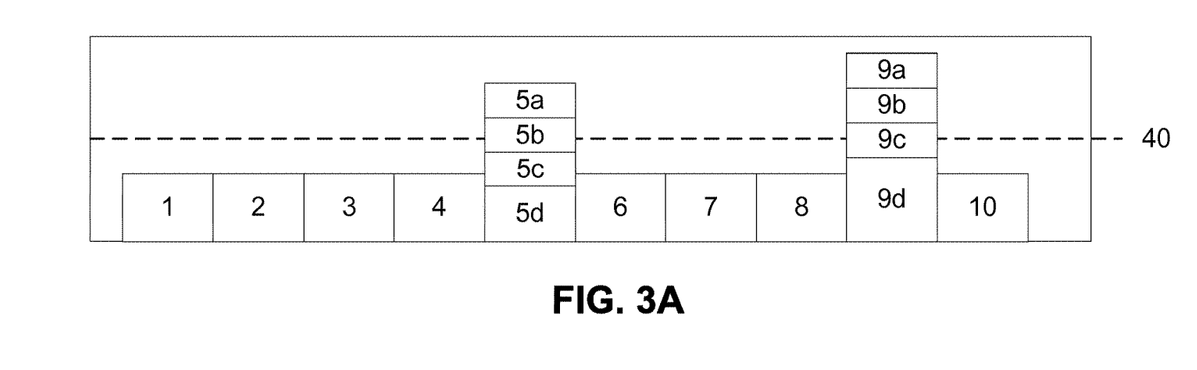
FIGS. 3A and 3B schematically depict a transmission process for providing the media content asset of FIG. 1 to a receiving device.
Figure 3B:
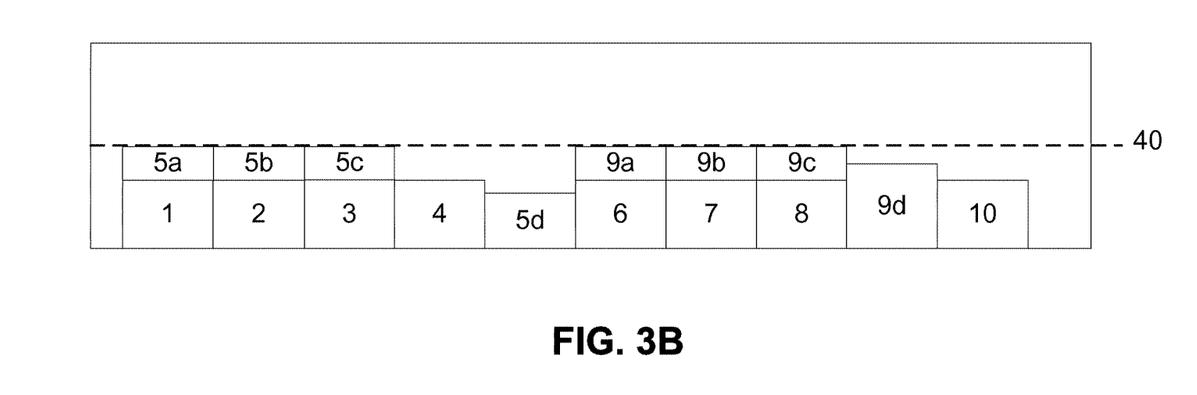

The content server 32 also reviews the information in the manifest file 38 to determine whether there are certain segments that will require greater bit-rates and whether there are other segments that may have lower bitrates such that they will not require all available resources to be utilized. A representation of this process is shown in FIGS. 3A-3B. The content server 32 detects transmission conditions, such as an available bandwidth 40. Segments 1, 2, 3, and 4 are small enough that they will not utilize the entire available bandwidth 40, but segment 5 is too large to be transmitted in real-time without some degradation of quality. Having this information, the content server 32 is able to utilize the excess bandwidth available during transmission of segments 1-4 to transmit portions of segment 5 (5a, 5b, and 5c), and only a small portion of segment 5 (section 5d) is left to be sent at the normal time of transmission of segment 5. In this way, when it is time for segment 5 to be played on the receiving device 34, the full, high bit-rate segment 5 will have been fully transmitted and will play at a high quality. The receiving device 34 may store the first three portions of segment 5 (5a, 5b, and 5c) in memory, and then combine or integrate all portions of segment 5 (5a-5d) for playback during the time slot for segment 5.

A similar process is shown for segments 6-9, wherein segments 6-8 do not require the full available bandwidth 40, but segment 9 is too large to be transmitted in real-time. Knowing this, the content server transmits portions of segment 9 (portions 9a, 9b, and 9c) during transmission of segments 6, 7, and 8, so that the final remaining portion 9d can be transmitted with the available bandwidth, and segment 9 can be combined/integrated and played on the receiving device 34 with full detail and clarity.

It should be understood that determination of a "high bit-rate" segment, that requires out of order, predictive transmission, may be an objective consideration (e.g., any segment having a bit-rate above a pre-determined numeric value), or it may be based on variable factors, such as transmission conditions (e.g., if the bit-rate of a segment approaches or exceeds an average available bandwidth).

Further, the determination of which segments to tag as high bit-rate segments requiring additional attention may be based not on actual segment bit-rates, but, rather, on alternative quality playback criteria. For example, priority settings may be imposed on each segment such that more "important" segments are given priority for higher quality transmissions than less important segments. In the media content asset 20, segments 1-5 may actually be encoded with the same bit-rate, but segments 1-4 may be such that some degradation in quality will not significantly affect a viewer's viewing experience. Conversely, segment 5 may require a high bit-rate to adequately capture all of the details shown in the segment. This being the case, segment 5 may be encoded with a higher priority such that the content server 32 will see the higher priority value, and, based on the limited available bandwidth, will make the decision to transmit segments 1-4 at a lower bit-rate so that segment 5 can be transmitted at the higher bit-rate. Such priority values may be automatically determined by a program or software (e.g., if a scene is detected in which there is lots of movement, that scene will be afforded higher priority versus a slower-moving, less detailed scene), or may be assigned manually (e.g., by a producer of the media content).

The systems and processes described in FIGS. 2, 3A, and 3B were discussed with reference to a "smart server" system. In such a system, it was the content server 32 that had the necessary information to make decisions as to how to transmit the media content asset 20 so as to maximize a user's viewing experience. In an alternative embodiment, the same systems and methods may be employed in a "smart client" arrangement. In a "smart client" arrangement, it is the receiving device 34 that tracks transmission conditions and uses the look-ahead information contained in the manifest 38 to determine the optimal transmission sequence.

In this "smart-client" arrangement, the receiving device 34 makes a request to the content server 32 to receive a particular media content asset for streaming. The receiving device 34 may have the manifest file 38 locally, or the manifest file 38 may be transmitted to the receiving device 34 when the media content asset 20 is requested. Once the receiving device 34 obtains possession of the manifest file 38, it may begin requesting segments of the media content asset 20 based on its determination of the optimal transmission sequence. For the example shown in FIGS. 3B and 3C, the receiving device 34 will see that segments 1-4 will not utilize the full available bandwidth 40, but segment 5 will require more bandwidth than is available. As such, the receiving device 34 will request a portion of segment 5 (5a) at the same time that it requests segment 1, and then another portion of segment 5 (5b) at the same time that it requests segment 2, and so on. The process is similar to that discussed above with reference to the "smart server" system, except that it is the receiving device 34 that is able to make the determination as to the optimal transmission sequence and then request certain segments or portions of segments accordingly.

Figure 4:
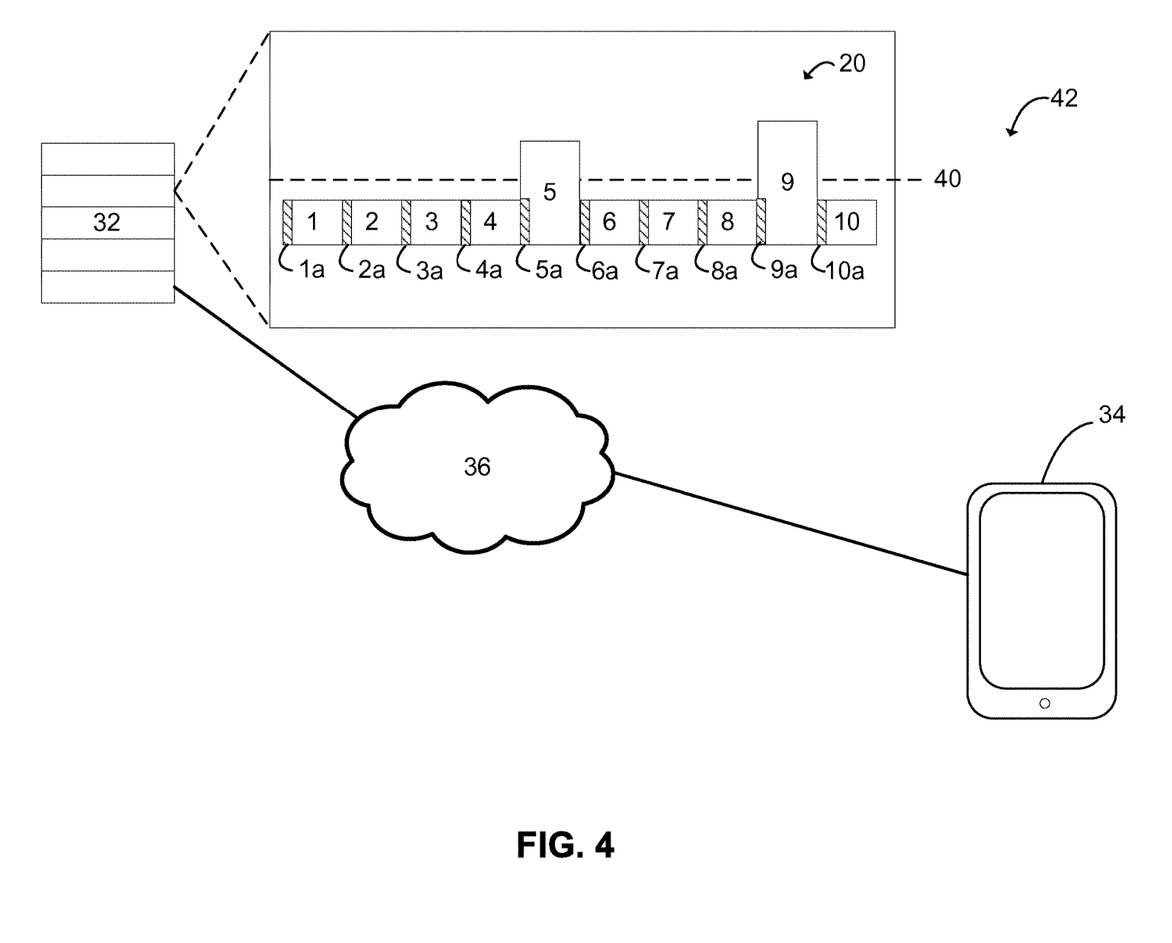
FIG. 4 schematically depicts a smart-client arrangement for providing the media content asset of FIG. 1 to a receiving device.

FIG. 4 provides a schematic representation of an alternative "smart client" arrangement. In the system 42 shown in FIG. 4, the content server 32 once again stores a media content asset 20 having 10 segments, including high bit-rate segments 5 and 9. However, rather than transmitting "look-ahead" information via a manifest file which contains forward-looking bit-rate information for the entire media content asset 20, headers 1a-10a are included with each of the segments 1-10. These headers 1a-10a contain look-ahead information regarding the bit-rate requirements of future segments. The receiving device 34 can then use the look-ahead information in the headers 1a-10a to decide the optimal order of transmission and make transmission request decisions.

For example, the receiving device 34 may send a transmission to the content server 32 requesting media content asset 20. The content server 32, upon receiving this request, transmits segment 1 of the media content asset 20, which also includes the header 1a. The header 1a includes bit-rate information for future segments in the media content asset 20 so that the receiving device 34 can make optimal transmission request decisions. For example, header 1a may include bit-rate information for the next "x" number of segments. If the header 1a contains bit-rate information for the next three (3) segments, then the receiving device 34, having knowledge of the transmission conditions and the available bandwidth 40, will see that the next three (3) segments 2, 3, 4 can be transmitted in real-time, and there is no need to make an adjustment. However, when segment 2 is transmitted along with header 2a, the receiving device 34 will see that segment 5 requires more than the available bandwidth, and will begin requesting portions of segment 5 to be sent early with segments 3, and 4. Conversely, if the headers 1a-10a contain bit-rate information for the next five (5) segments, then the receiving device 34 will see segment 5's high bit-rate requirements as soon as segment 1 and header 1a are transmitted, and begin requesting portions of segment 5 right away.

Other implementations are also possible. For example, the headers 1a-10a may indicate the next high bit-rate segment that requires substantially more bandwidth than other segments. The headers for segments 1-4 may all contain bitrate information for segment 5, such that the receiving device 34 is made aware of the upcoming high bit-rate requirements of segment 5, and segments 6-8 may contain bitrate information or segment 9, etc. Alternatively, as discussed above, rather than containing bit-rate information, the headers 1a-10a may contain priority information such that quality determinations can be made based on segment priority. In this embodiment, segments 5 and 9 may have a higher priority determination than the other segments such that when there is excess bandwidth available, portions of segments 5 and 9 are transmitted earlier. In yet another implementation, headers may only be provided intermittently, rather than with every segment.

It should be understood that while the figures have presented exemplary embodiments of the present systems and methods, revisions may be made to the disclosed systems and methods without departing from the scope of the present disclosure. In a broader sense, the present disclosure provides for systems and methods that allow for an improved user experience by providing the ABS system with forward-looking information about the media content asset being played. The ABS system is able to utilize current transmission condition information and/or the forward-looking media content information to determine an optimal transmission sequence so that scenes having higher bit-rates or requiring higher bit-rates for optimal viewing can be planned for in advance and transmitted earlier in the process.

Where components or modules of the disclosed systems and methods are implemented in whole or in part using software, in one embodiment, these software elements can be implemented to operate with a computing or processing module capable of carrying out the functionality described with respect thereto. After reading this description, it will become apparent to a person skilled in the relevant art how to implement the disclosure using other computing modules or architectures.

As used herein, the term module might describe a given unit of functionality that can be performed in accordance with one or more implementations. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 5:
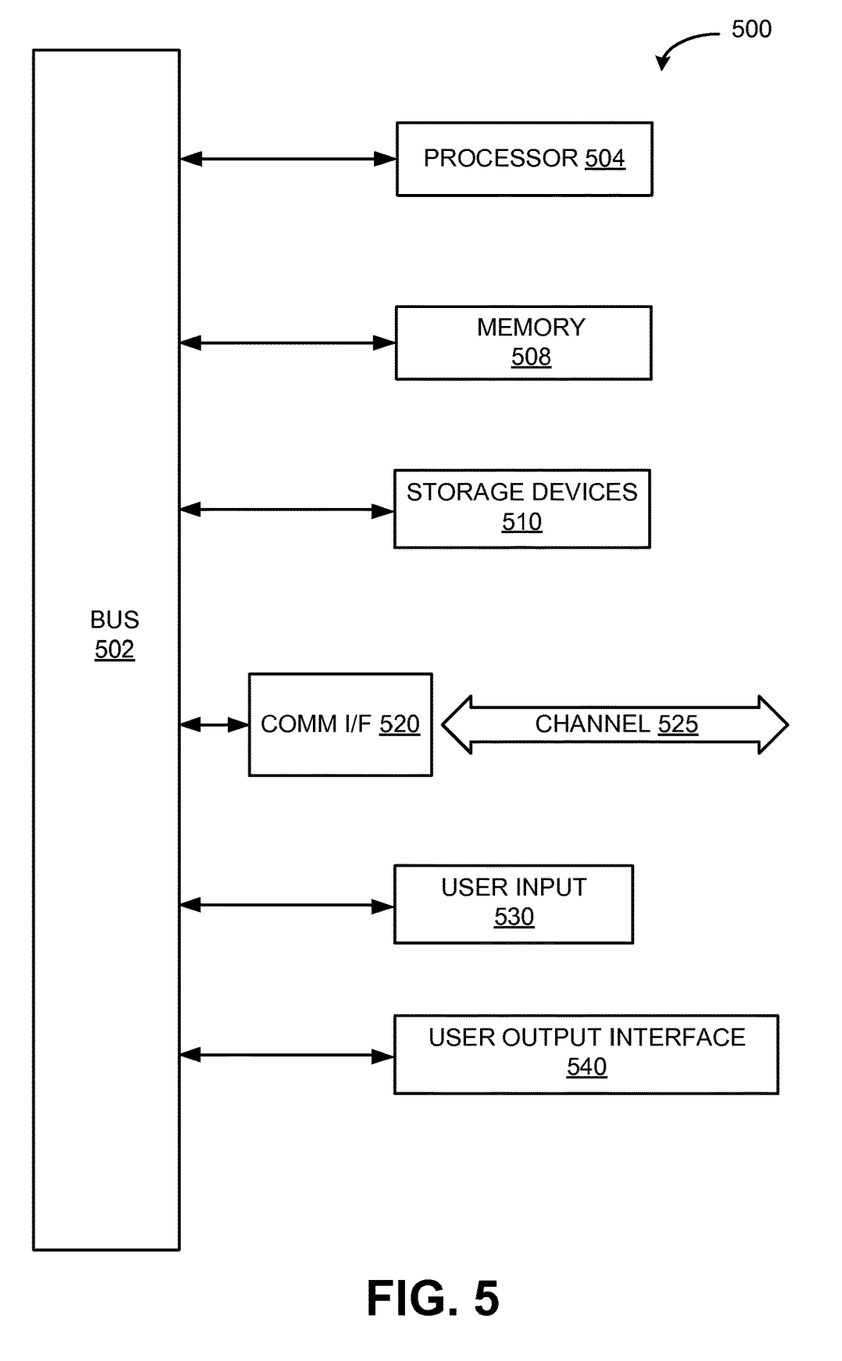
FIG. 5 illustrates a sample computing module that may be used to implement certain features and embodiments of the present disclosure.

Referring now to FIG. 12, computing module 500 may represent, for example, computing or processing capabilities found within desktop, laptop and notebook computers; hand-held computing devices (PDA's, smart phones, cell phones, palmtops, tablets, etc.); or any other type of special-purpose or general-purpose computing devices as may be appropriate. Computing module 500 might also represent computing capabilities embedded within or otherwise available to a given device. For example, a computing module might be found in other electronic devices such as, for example, televisions, home theaters, Blu-Ray disc players, DVD players, in-car entertainment systems, video game consoles, video download or streaming devices, portable DVD players and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the illustrated example, processor 504 is connected to a bus 502, although any communication medium can be used to facilitate interaction with other components of computing module 500 or to communicate externally.

Computing module 500 might also include one or more memory modules, simply referred to herein as main memory 508. Memory may include any non-transitory storage medium. For example, preferably random access memory (RAM) or other dynamic memory, might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504. The computing module 500 might also include one or more various forms of information storage mechanism 510, which might include, for example, a magnetic tape drive, an optical disc drive, a solid state drive, or any other non-volatile memory.

Computing module 500 might also include a communications interface 520. Communications interface 520 might be used to allow software and data to be transferred between computing module 500 and external devices. Examples of communications interface 520 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 520 might typically be carried on signals, which can be electronic, electromagnetic (which includes optical) or other signals capable of being exchanged by a given communications interface 520. These signals might be provided to communications interface 520 via a channel 525. This channel 525 might carry signals and might be implemented using a wired or wireless communication medium. Some examples of a channel might include a phone line, a cellular link, an RF link, an optical link, a network interface, a local or wide area network, and other wired or wireless communications channels.

Computing module 500 might also include one or more user inputs 530. The user input allows for the user to enter commands to the computing module 500 and interact with it. Examples of user inputs might include a computer mouse, a keyboard, a touch-sensitive screen, a stylus, a mousepad, a joystick, an accelerometer, a gyroscope, a camera, a remote control, or any other user input mechanism.

The computer module 500 might also include one or more user output interfaces 540. The user output interfaces 540 might be used to interact with the user by presenting information or sensory outputs for the user. Examples of user output interfaces might include visual outputs, such as a display screen or monitor, or audio outputs, such as a speaker or headphone output.

In this document, the terms "computer readable medium" and "computer usable medium" are used to generally refer to media such as, for example, memory 508, storage unit 510, and channel 525. These and other various forms of computer readable media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present disclosure as discussed herein.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features. Additionally, with regard to flow diagrams, operational descriptions and method claims, the order in which the steps are presented herein shall not mandate that various embodiments be implemented to perform the recited functionality in the same order unless the context dictates otherwise. Thus, the breadth and scope of the present disclosure should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

Although the disclosure has been presented with reference only to the presently preferred embodiments, those of ordinary skill in the art will appreciate that various modifications can be made without departing from this disclosure. As such, the disclosure is defined only by the following claims and recited limitations.

The invention claimed is:

1. A method comprising:
receiving a request from a device for transmission of a media content asset, the media content asset comprising a single media content asset file comprising a plurality of variable bit-rate encoded segments arranged in a particular order, at least one of the plurality of segments of the single media content asset file being a high bit-rate segment transcoded at a higher bit rate than one or more bit-rate segments preceding the high bit-rate segment in the particular order;
transmitting the plurality of segments in the particular order to the device;
detecting the high bit-rate segment; and
transmitting data for the high bit-rate segment out of order in the one or more bit-rate segments preceding the high bit-rate segment to the device.

2. The method of claim 1, wherein the media content asset further comprises a manifest file, the manifest file comprising bit-rate information for each of the plurality of segments, wherein the method further comprises: using at least the manifest file to determine that a portion of the high bit-rate segment needs to be transmitted out of order in the one or more bit-rate segments preceding the high-bit rate segment.

3. The method of claim 1 further comprising detecting transmission conditions.

4. The method of claim 3, wherein detecting an upcoming high bit-rate segment further comprises using the transmission conditions to determine a high bit-rate segment.

5. The method of claim 1, wherein transmitting data for the high bit-rate segment out of order further comprises transmitting data for the high bit-rate segment simultaneously with the one or more bit-rate segments preceding the high bit-rate segment.

6. A method comprising:
requesting transmission of a media content asset, the media content asset comprising a single media content asset file comprising a plurality of variable bit-rate encoded segments arranged in a particular order, at least one of the plurality of segments of the single media content asset file being a high bit-rate segment transcoded at a higher bit rate than one or more bit-rate segments preceding the high bit-rate segment in the particular order;
receiving bit-rate information for upcoming segments in the single media content asset file, the upcoming segments comprising the high-bit rate segment;
receiving the plurality of segments in the particular order;
detecting an upcoming high bit-rate segment using the bit-rate information;
requesting data for the high bit-rate segment out of order; and
receiving the requested data for the high bit-rate segment out of order.

7. The method of claim 6, wherein the single media content asset file further comprises a plurality of headers associated with one or more of the plurality of segments, and the bit-rate information is contained within the plurality of headers.

8. The method of claim 7, wherein each of the plurality of segments comprises a header, the header of each of the plurality of segments comprising bit-rate information for each of a predetermined number of upcoming segments, wherein detecting the upcoming high bit-rate segment comprises: detecting the upcoming high bit rate segment in a header of the one or more bit-rate segments preceding the high bit-rate segment.

9. The method of claim 6, wherein the media content asset further comprises a manifest file, and the bit-rate information is contained within the manifest file, wherein the method further comprises: using at least the manifest file to determine that a portion of the high bit-rate segment needs to be transmitted out of order in the one or more bit-rate segments preceding the high-bit rate segment.

10. The method of claim 6, wherein requesting data for the high bit-rate segment out of order further comprises requesting data for the high bit-rate segment simultaneously with the one or more bit-rate segments preceding the high bit-rate segment.

11. A non-transitory computer readable medium comprising an instruction set configured to cause a computing device to perform:
receiving a request from a device for transmission of a media content asset, the media content asset comprising a single media content asset file comprising a plurality of variable bit-rate encoded segments arranged in a particular order, at least one of the plurality of segments of the single media content asset file being a high bit-rate segment transcoded at a higher bit rate than one or more bit-rate segments preceding the high bit-rate segment in the particular order;
transmitting the plurality of segments in the particular order to the device;
detecting the high bit-rate segment; and
transmitting data for the high bit-rate segment out of order in the one or more bit-rate segments preceding the high bit-rate segment to the device.

12. The non-transitory computer readable medium of claim 11, wherein the media content asset further comprises a manifest file, the manifest file comprising bit-rate information for each of the plurality of segments, wherein the instruction set is further configured to cause the computing device to perform: using at least the manifest file to determine that a portion of the high bit-rate segment needs to be transmitted out of order in the one or more bit-rate segments preceding the high-bit rate segment.

13. The non-transitory computer readable medium of claim 11 further comprising detecting transmission conditions.

14. The non-transitory computer readable medium of claim 13, wherein detecting an upcoming high bit-rate segment further comprises using the transmission conditions to determine a high bit-rate segment.

15. The non-transitory computer readable medium of claim 11, wherein transmitting data for the high bit-rate segment out of order further comprises transmitting data for the high bit-rate segment simultaneously with the one or more bit-rate segments preceding the high bit-rate segment.

16. A non-transitory computer readable medium comprising an instruction set configured to cause a computing device to perform:
   requesting transmission of a media content asset, the media content asset comprising a single media content asset file comprising a plurality of variable bit-rate encoded segments arranged in a particular order, at least one of the plurality of segments of the single media content asset file being a high bit-rate segment transcoded at a higher bit rate than one or more bit-rate segments preceding the high bit-rate segment in the particular order;
   receiving bit-rate information for upcoming segments in the single media content asset file, the upcoming segments comprising the high-bit rate segment;
   receiving the plurality of segments in the particular order;
   detecting an upcoming high bit-rate segment using the bit-rate information;
   requesting data for the high bit-rate segment out of order; and
   receiving the requested data for the high bit-rate segment out of order.

17. The non-transitory computer readable medium of claim 16, wherein the single media content asset file further comprises a plurality of headers associated with one or more of the plurality of segments, and the bit-rate information is contained within the plurality of headers.

18. The non-transitory computer readable medium of claim 17, wherein each of the plurality of segments comprises a header, the header of each of the plurality of segments comprising bit-rate information for each of a predetermined number of upcoming segments, wherein detecting the upcoming high bit-rate segment comprises: detecting the upcoming high bit rate segment in a header of the one or more bit-rate segments preceding the high bit-rate segment.

19. The non-transitory computer readable medium of claim 16, wherein the media content asset further comprises a manifest file, and the bit-rate information is contained within the manifest file, wherein the instruction set is further configured to cause the computing device to perform: using at least the manifest file to determine that a portion of the high bit-rate segment needs to be transmitted out of order in the one or more bit-rate segments preceding the high-bit rate segment.

20. The non-transitory computer readable medium of claim 16, wherein requesting data for the high bit-rate segment out of order further comprises requesting data for the high bit-rate segment simultaneously with the one or more bit-rate segments preceding the high bit-rate segment.

* * * * *